United States Patent
Chawla et al.

(10) Patent No.: US 8,307,187 B2
(45) Date of Patent: Nov. 6, 2012

(54) VDI STORAGE OVERCOMMIT AND REBALANCING

(75) Inventors: Puneet Singh Chawla, Sunnyvale, CA (US); Ke Jin, Foster City, CA (US); Frank Taylor, Hertfordshire (GB); Keith Johnston, Menlo Park, CA (US); Amit Patel, Cupertino, CA (US)

(73) Assignee: VMware, Inc., Palo Alto, CA (US)

( * ) Notice: Subject to any disclaimer, the term of this patent is extended or adjusted under 35 U.S.C. 154(b) by 713 days.

(21) Appl. No.: 12/558,443

(22) Filed: Sep. 11, 2009

(65) Prior Publication Data

US 2010/0070978 A1    Mar. 18, 2010

Related U.S. Application Data

(60) Provisional application No. 61/096,698, filed on Sep. 12, 2008.

(51) Int. Cl.
*G06F 13/00* (2006.01)
(52) U.S. Cl. .................................. 711/173; 711/E12.013
(58) Field of Classification Search ..................... None
See application file for complete search history.

*Primary Examiner* — Edward Dudek, Jr.
*Assistant Examiner* — Sean D Rossiter
(74) *Attorney, Agent, or Firm* — Leonard E. Heyman

(57) ABSTRACT

A method for managing storage for a desktop pool is described. The desktop pool includes a plurality of virtual machines (VMs), each VM having at least one virtual disk represented as a virtual disk image file on one of a plurality of datastores associated with the desktop pool. To identify a target datastore for a VM, a weight of each datastore is calculated. The weight may be a function of a virtual capacity of the datastore and the sum of maximum sizes of all the virtual disk image files on the datastore. The virtual capacity is a product of the data storage capacity of the datastore and an overcommit factor assigned to the datastore. The target datastore is selected as the datastore having the highest weight. The VM may be moved to or created on the target datastore.

22 Claims, 7 Drawing Sheets

Add Desktop

Datastores

Choose a set of datastores on which to store new virtual machines

☐ = Local Datastore
👥 = Shared Datastore

| | Name | Capacity (GB) | Free (GB) | Type | Use For | Storage Overcommit* |
|---|---|---|---|---|---|---|
| ☐ | 👥 Datastore 1 | 500.00 | 104.6 | VMFS | User Data ▾ | Conservative ▾ |
| ☐ | 👥 Datastore 2 | 50.00 | 1.20 | VMFS | | |
| ☑ | ☐ Datastore 3 | 50.00 | 50.00 | VMFS | OS, User Data ▾ | Moderate ▾ |
| ☐ | ☐ Datastore 4 | 50.00 | 50.00 | VMFS | | |
| ☐ | ☐ Datastore 5 | 50.00 | 50.00 | VMFS | | |
| ☐ | 👥 Datastore 6 | 50.00 | 45.06 | VMFS | OS Data ▾ | Aggressive ▾ |
| ☐ | 👥 Datastore 7 | 50.00 | 31.09 | VMFS | | |
| ☐ | 👥 Datastore 8 | 50.00 | 0.80 | VMFS | | |

* The storage overcommit setting is used to specify how much space will be reserved on the datastore for sparse disk growth. As the aggressiveness increases, less space will be reserved for sparse disk groth but more virtual machines will fit on the datastore.

| | Minimum Required | Required at 50% Utiliz. | Maximum Required |
|---|---|---|---|
| OS Data Free Space: | 25.00 GB | 16 MB | 42.94 GB | 85.99 GB |
| User Data Free Space: | 25.00 GB | 22 MB | 133.94 GB | 267.88 GB |

[<Back]  [Next>]  [Cancel]

Fig. 3

VDI STORAGE OVERCOMMIT AND REBALANCING

CROSS-REFERENCE TO RELATED APPLICATIONS

This patent application claims benefit of U.S. Provisional Patent Application 61/096,698, filed Sep. 12, 2008, which is wholly incorporated herein by reference.

BACKGROUND

Virtual Desktop Infrastructure (VDI) refers to a system of providing complete centrally-managed desktops to users using computer virtualization technology. VDI is used to create a large number of independent computing environments for a large number of users. The desktop users may be grouped together based on similar software and computing needs. The desktops themselves are correspondingly grouped together in "desktop pools" that may be provisioned, managed, and deleted as single entities. In VDI, each desktop is exported to the user from a virtual machine that is assigned to the user. The desktop pools are associated with resources in the datacenter, including, but not limited to, compute resources, memory, network, and storage.

Computer cloning is used to provide independent virtual machines to different users. The clones are created by copying a master virtual disk image file (sometimes called a "template") that has all the necessary software required for all users in the user pool, except that each clone can have its own identity (i.e., network address, computer name, etc.). In this way, VDI enables users, from remote terminals, to access virtualized desktop computers, in the form of virtual machines, so as to be able to have working sessions that are isolated from the sessions of other users and that can be stored and even migrated to different physical platforms as the need arises.

Traditional cloning processes create full copies of the master virtual disk image file, which may then be "personalized" by giving each clone its own identity. The master virtual disk image file is designed to contain the operating system and software, as well as any associated data files and default user settings, that each user is expected to need. Recent advances in cloning technologies have introduced new ways of fast cloning using thin disks. The term "thin disk" is used herein to refer to a representation of a disk image whose logical size is greater than its physical size. In other words, the amount of addressable space provided by the virtual disk represented by the virtual disk image file is greater than the size of the virtual disk image file itself. Examples of thin disks include "sparse disks" and "delta disks." A sparse disk is a disk image that defines the contents of a disk, but does not include "empty sector" data. A delta disk, also referred to as a "REDO log" or "copy-on-write" disk, contains the differences between the disk itself and a master or parent disk image. A delta disk can be significantly smaller than the logical size of the disk when the delta disk has much of the same content as the master image.

Thin disk cloning reduces the initial space occupied by the virtual machines on storage. A virtual machine typically includes configuration and state information plus the disk data, with the disk data typically being most of the data that represents the virtual machine. A "thin clone" is a representation (e.g., in a file) of a cloned virtual machine that includes one or more thin disk images for the cloned virtual machine. U.S. patent application Ser. No. 12/058,269, filed Mar. 28, 2008, describes technology for separating the computer operating system and user personality into different virtual disks (REDO disks or thin disks) on storage. With this technology, a delta (or redo) file is created that defines the differences from a "master" file.

Because the virtual disk(s) for each desktop will grow over time, the desktop provisioning software leaves some growth buffer for virtual desktops on the physical data store. Additionally, if a virtual desktop continues to grow over time, it can occupy the space required for a similar "full clone." Desktop management software may monitor and contain the growth of virtual desktops.

SUMMARY

A desktop pool includes a plurality of virtual machines (VMs), each VM having at least one virtual disk represented as a virtual disk image file on one of a plurality of datastores associated with the desktop pool. To identify a target datastore for a VM, a weight of each datastore is calculated. The weight may be a function of a virtual capacity of the datastore and the sum of maximum sizes of all the virtual disk image files on the datastore. The virtual capacity is a product of the data storage capacity of the datastore and an overcommit factor assigned to the datastore. The target datastore is selected as the datastore having the highest weight. The VM is moved to or created on the target datastore.

BRIEF DESCRIPTION OF THE DRAWINGS

FIG. 3 shows, by way of example, a storage allocation screen for one desktop pool.

DETAILED DESCRIPTION

A system of software components are described herein that provide an efficient solution for managing thin provisioned desktop pools. As will be explained in detail below, virtual machine (VM) technology and modern storage hardware allow for the creation of VMs having physical storage requirements that are only a fraction of the virtual disk size that is required by the virtual machine at clone creation time. Ongoing usage of a VM results in growth of its virtual disks. The rate of growth is primarily dependent on application workload running inside the VM. Efficient use of physical disk storage space is a constant problem in the field of data center management for virtual desktop infrastructures.

Figure 1:
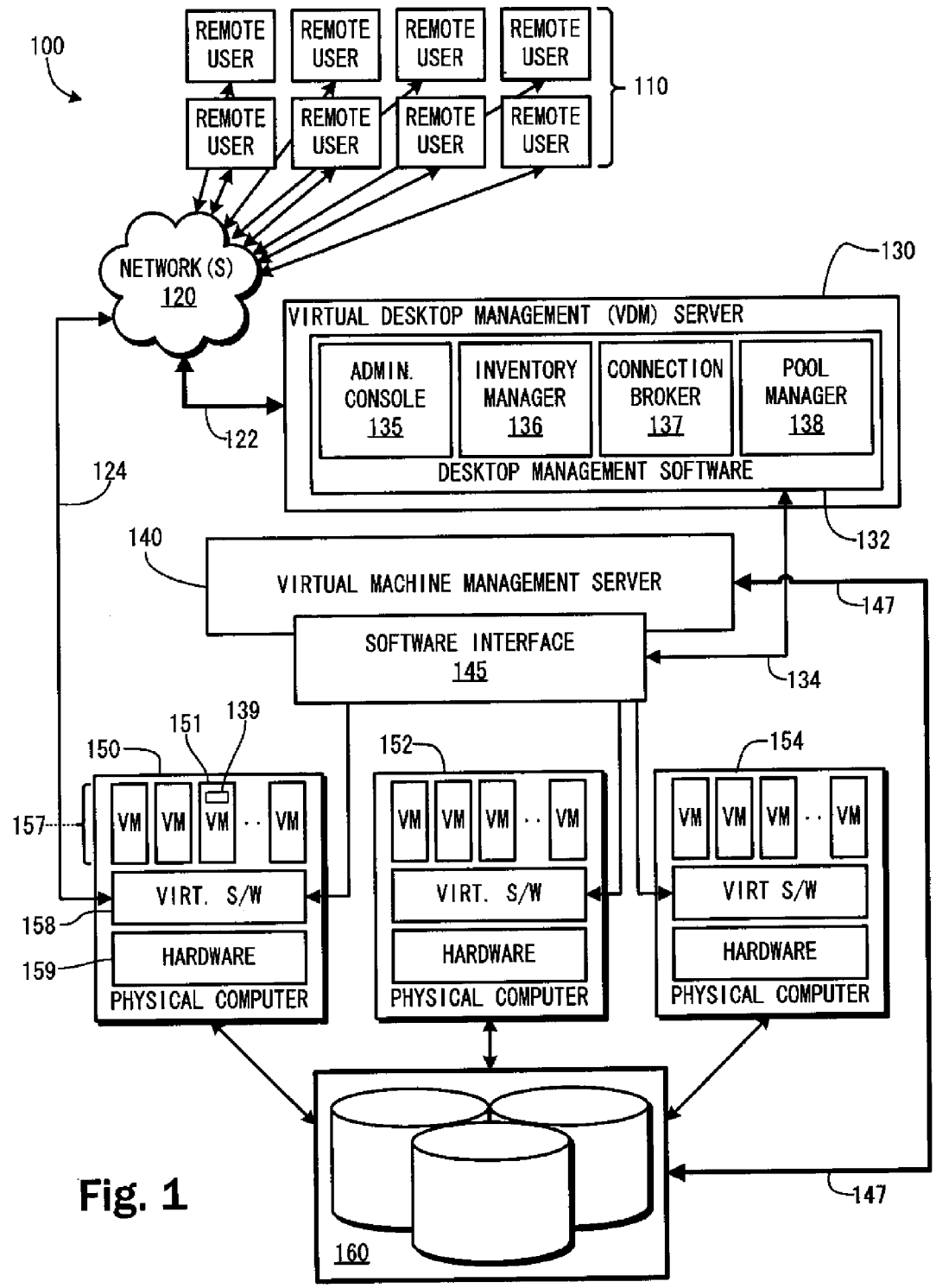
FIG. 1 shows, by way of example, a virtual desktop infrastructure having a plurality of remote users accessing virtual machines running on physical computer systems.

FIG. 1 shows, by way of example, a virtual desktop infrastructure (VDI) 100, having a plurality of remote users 110 accessing virtual machines (VMs) 157 on physical computer systems 150, 152, 154. Each user may access their VM using a thin client (not shown) or a client software program running on a thick client (not shown) such as a desktop computer system, laptop, or a device (not shown) such as a mobile "palm top" or smart phone. A user session comprises a connection between a VM and the corresponding user of the VM. Each VM 157 provides a corresponding "desktop" to the user. The desktop is an interactive user environment provided by a guest operating system and applications running within the VM, and generally includes a graphical display, but may include other outputs such as audio, indicator lamps, tactile feedback, etc. The desktop also accepts input from the user in the form of device inputs, such as keyboard and mouse inputs. In addition to user input/output, the connection may send and receive device data, such as input/output for a FLASH memory device local to the remote user, or to a local printer.

In large organizations, users can generally be categorized in terms of their job functions, and accordingly the required applications and configurations of their desktops. For example, users in an engineering "pool" may require access to CAD/CAM software, whereas users in an accounting pool may require access to particular accounting software. It is generally useful to group user desktops together in a manner consistent with such groupings of the users, so that computers accessed by engineers, for example, are configured with software required by engineers whereas computers accessed by accountants are configured with software accessed by accountants. In VDI system 100, for example, users 110 may belong to a particular user pool, and their corresponding VMs 157 may be assigned to a corresponding desktop pool. A desktop pool is a logical manageable entity that includes a plurality of similarly-configured VMs. Each VM of a desktop pool may have delta disk image associated with the VM and a common "master image" (sometimes referred to as a "template") that is common to all the desktops in the pool. The master image may include installed software useful for the members of the corresponding user pool.

Virtual desktop management server (VDMS) 130 may be a physical computer system or a virtual machine that runs desktop management software 132. An exemplary VDMS is described in U.S. patent application Ser. No. 11/395,012, filed Mar. 31, 2006 by Puneet Chawla, et al. Desktop management software 132 manages pools of computer resources to run VMs 157 on a set of clusters typically containing multiple servers with CPUs, memory, and communications hardware (network). In the embodiment shown in FIG. 1, desktop management software 132 includes a number of modules, including an administrative console 135, an inventory manager 136, a connection broker 137, and a pool manager 138.

Administrative console 135 provides a remotely-accessible user interface to a desktop administrator to manage the configuration of desktop pools. In one embodiment, a graphical user interface may be exported via hypertext transfer protocol (HTTP) and accessed by a commodity web browser. Alternatively, a command-line interface or a rich client can be provided to local or remote users. Administrative console 135 allows the desktop administrator to perform a plurality of functions, such as: create desktop pools; associate desktop pools with the VDMS; associate a desktop pool with a master image; define VM state policies; setup custom messages to be sent to users (e.g., when the desktops are put into maintenance mode for weekly patches, hotfixes, etc.); set storage overcommit settings for different datastores used by for desktop pools; perform rebalance operations on a set of virtual desktops; and other similar operations.

As mentioned above, each desktop pool may be associated or assigned to a particular VDMS. Likewise, each VDMS may manage multiple desktop pools. The association between desktop pool and VDMS may include details such as: assignment of computer resources (e.g., hosts and/or clusters) to VMs; logical "resource pools" (e.g. such as described in virtual infrastructure distributed resource scheduling (DRS) available from VMware, Inc. and such as described in U.S. patent application Ser. No. 11/405,806 filed Apr. 17, 2006 and incorporated herein) for load balancing; memory sharing configuration (e.g. reserve memory for virtual machines or use memory overcommit); storage used to provision the VMs (one or more datastores); guest customization details like custom naming scheme for VMs in the pool (e.g.—using "marketingxxxx" as a custom name such that VMs in the pool are called marketing0001 to marketing9999); and domain membership info (add VM to domain vmware-vdi.com). Other information aside from that mentioned specifically above may be included in the pool-VDMS association, which information may be stored in a database (not shown) accessible by or incorporated into VDMS 130.

Virtual Machine Management Server (VMMS) 140 provides a software interface 145 that, among other things, allows other programs to control the lifecycle of virtual machines 157 running on physical computers 150, 152, 154, that are managed by VMMS 140. Desktop management software 132 interfaces with VMMS using software interface 145 to control VMs 157. For example, VMMS 140 may allow desktop management software 132 to: discover computer, storage, and network resources; create of logical compute pools providing features like automatic CPU and memory load balancing; create VMs with one or more virtual disks on local or shared storage, e.g., clones with full or sparse disks; create VMs anchored to a base virtual machine (e.g., as described in U.S. patent application Ser. No. 12/058,269 filed Mar. 28, 2008 and entitled, "Synchronization and customization of a Clone Computer" and incorporated herein by reference); monitor storage subsystems, including, but not limited to, storage consumption of individual disks, storage consumption of virtual machines as a single unit and virtual machine file system monitoring (free space, total space, etc); perform power operations on virtual machines (i.e., power on, power-off, suspend, resume, checkpoint, etc.); perform offline migrations of virtual disks from one datastore to another; perform hot storage migration wherein VM disks are migrated during operation of the VM (e.g., as described in U.S. patent application Ser. No. 12/184,134, incorporated herein by reference); and provide an out of band communication channel to software program running inside the virtual machine. VMMS 140 may provide other VM management and manipulations than those specifically mentioned here.

Each physical computer 150, 152, 154, includes hardware 159, virtualization software 158 running on the hardware, and one or more virtual machines 157 executing on hardware 159 by way of virtualization software 158. Virtualization software 158 is therefore logically interposed between, and interfaces with, hardware 159 and VMs 157. Hardware 159 includes at least one processor, each processor being an execution unit, or "core," on a microprocessor chip. Hardware 159 also includes (not shown) system memory, which is general volatile random access memory (RAM), a network interface port (NIC), and other devices. In some embodiments, hardware 159 may include local non-volatile storage (not shown). Virtualization software 158 is sometimes referred to as a hypervisor, and includes software components for managing hardware resources and software components for virtualizing or emulating system resources for each VM 157. Each VM is an abstraction of a physical computer system and includes an operating system (OS) such as Microsoft Windows® and applications, which are referred to as the "guest OS" and "guest applications," respectively, the term "guest" indicating it is a software entity that resides within the VM.

Non-persistent desktops are stateless desktops, i.e., the desktop state is restored to the original state after every user session. For non-persistent desktops, any changes written to the virtual disks are lost at the end of the user session. Therefore, each time a user logs off, the desktop is restored to its original "pristine" state. If a user is assigned to a pool of non-persistent desktops, the user may be assigned to any VM in the pool at the time the user logs in, since they are all identical. There are many use cases for non-persistent desktops, such as for data entry, information kiosks or process terminals, etc.

Persistent desktops maintain the state of the files or applications stored inside the virtual machines. For persistent desktops, any changes written to the virtual disks are preserved, and are available at the next user session. There may be hybrid states, such as maintaining persistence for a period of time, but periodically reverting to the "pristine" state. In some embodiments, the desktop administrator can define how frequently, or under what conditions, the "revert to pristine state" operation should be performed.

For example, a department of an offshore organization may include a plurality of data-entry clerks and a manager. The manager may be provided access to a private persistent VM, and the data-entry clerks may be provided access to a logical grouping of non-persistent VMs. The data-entry clerks may use any VM in the logical grouping to perform data entry, for example, in a database. However, because the VMs in the logical grouping are non-persistent, and are configured to discard their session state every day, no changes made during a working session may be persisted in the VM. This ensures that the data-entry clerks obtain consistent desktops regardless of which VM in the logical grouping is being used, and provides an additional layer of security. However, because the manager has access to a persistent VM, changes to the desktop's software of documents may be made by the manager. For example, the manager may create files using an application like Microsoft® Office, and store those files on the desktop executing in the persistent VM. When the manager connects to the desktop on subsequent attempts, all files and application software is available as they were left prior to shutting down the VM or ending his prior user session.

Inventory Manager 136 handles the events received from the virtual desktops. When a user logs off or disconnects, user agent 139 (not shown) running within guest VM 151 sends a notification to inventory manager 136. Inventory Manager 136 may then compute the effective policy that applies to the desktop and performs a maintenance operation, if required. The inventory manager 136 can also be clustered so that if one desktop management server is down—the event can be handled by a peer node (clustered desktop management server configuration). Inventory Manager 136 may also use timer-based events to schedule effective maintenance operations.

A directory server or database (not shown) may be provided for storing the persistent state required for managing the desktop pools. In one embodiment, VMs in a desktop pool are associated with one or more users, each having a user identifier that is stored in the directory server. The users may be referenced through an external directory server like Microsoft Active Directory®, Novell eDirectory™, IBM Tivoli® Directory Server, etc. In one embodiment, the directory server or database contains information as summarized in Table 1.

TABLE 1

| Data Type | Description |
| --- | --- |
| Desktop Pools | Contains details such as display name of a pool (e.g. - "marketing desktops"), number of desktops required in the pool, default power state of the pool (powered-on, suspended, configured to go into low power states like ACPI S1/WoL, powered-off, etc), pool creation date, etc |
| Storage LUNs for each desktop pool | An association between a desktop pool and specific storage logical units (LUNs). |
| Overcommit configuration of each datastore. | Each datastore may be configured for none, conservative, medium, or aggressive overcommit. |
| Disk type for virtual machine | E.g., full disk, delta disk, linked clone, or synchronized clone |
| Disk kind for datastore | E.g., user disk, OS (operating system) disk, guest page file, hypervisor kernel software swap file, master disks only, etc. |
| Details of VMs created in the pools | Unique computer name, identifier and inventory location in VMMS 140, unique reference identifier on VMMS 140, etc |
| Users | Unique identifier for user accounts, e.g., external references to Active Directory ® Server, Novell eDirectory ™, etc |
| Entitlements | Mappings between users and desktops (i.e., mappings between users and specific VMs or pools). |
| State policies | Action to be taken on a VM after a user is logged off. E.g., always on, suspend when not in use, power off when not in use, etc. |
| Policy for reducing disk utilization | Perform disk cleanup and virtual disk defragment and shrinking of REDO disks when user logs off Perform OS disk refresh at regular intervals (for scalable virtual image (SVI) clones) |
| Scheduled operation details | e.g. perform refresh OS disk or a disk cleanup operation for at a specified time and date. |
| Automatic rebalancing thresholds | For e.g. perform rebalance evaluations when datastore used capacity >90% |

In one embodiment, software agent 139 is installed in the master image for a desktop pool and is automatically cloned to all virtual desktops provisioned in the pool, as shown by way of example in VM 151 (only one instance of agent 139 shown). Agent 139 may alternatively be pushed to all the clones using external software update tools like Microsoft SMS, Altiris SVS, etc. Agent 139 may be configured to connect to VDMS 130 to notify VDMS 130 on every user login, user logoff and user disconnect operation. These user operations are standard terms used in remote computer terminal software and should therefore be understood by those skilled in the art.

In addition to the notification functions, agent 139 may be configured to perform certain guest operations such as: (1) compute and report the disk utilization (e.g. "disk C: is 80% full—24 GB of 30 GB used"); (2) Perform disk cleanup, i.e., remove temporary internet files, remove downloaded program files, empty recycle bin, remove windows temporary files, etc.; (3) keep track of software inventory and, optionally, remove windows components or user-installed applications based on desktop management server policies; (4) keep track of files and optionally, compress or remove old files; and (5) other operations on behalf of VDMS 130 or VMMS 140.

As mentioned previously, a VM clone is a virtual machine whose one or more virtual disks are created from the virtual disks of a master (sometimes called "template") VM. Typically, the clone VM shares its virtual disks with the master VM in an ongoing manner using delta disks, which contain only the differences between the virtual disk and the master disk image (or intermediate disk image, such as another delta disk). At the time of creation, a cloned VM is conceptually copy of the master VM but with a separate identity. The separate identity means that the clone may be assigned to a user, network-addressed, powered on, suspended, snapshotted, reconfigured, etc. independent of the master VM.

The starting physical size of each thin virtual disk (i.e., the amount of space the thin virtual disk takes up in the datastore) is a fraction of the total logical size of the virtual disk. The logical size is the amount of disk space that is addressable in the virtual disk image. Therefore, the administrator can create a lot of VMs having thin virtual disks on the same datastore using the assumption that VMs will never grow to the maximum possible size, i.e., their physical size will never grow to their logical size. In other words, the administrator is able to "overcommit" the storage. The key difference compared to pre-allocated full clones is that the administrator needs to make some assumptions about the average growth of each VM over the lifecycle of the VM for any sort of overcommit.

For example, suppose a desktop administrator wants to create 100 desktops and the size of the master VM is 10 GB. Using full size clones, the administrator would need to allocate at least 1000 GB of disk space to provision the virtual machines. (Additional space may be needed, e.g., for log files and temporary VM state like hypervisor swap files, etc.) With thin disks, the desktop management software may be configured to create the VMs, each with starting disk image size of 10 MB, approximately 0.1% of the logical size of the disk images, and therefore possibly create a larger number of virtual machines using the same or less storage. A decision has to be made as to how much "head room" or free disk space to provide in a datastore containing thin virtual disks for future growth of the disks, wherein the rate of growth will vary depending on how each of the VMs that are attached to the virtual disks stored in the datastore are used.

Figure 2:
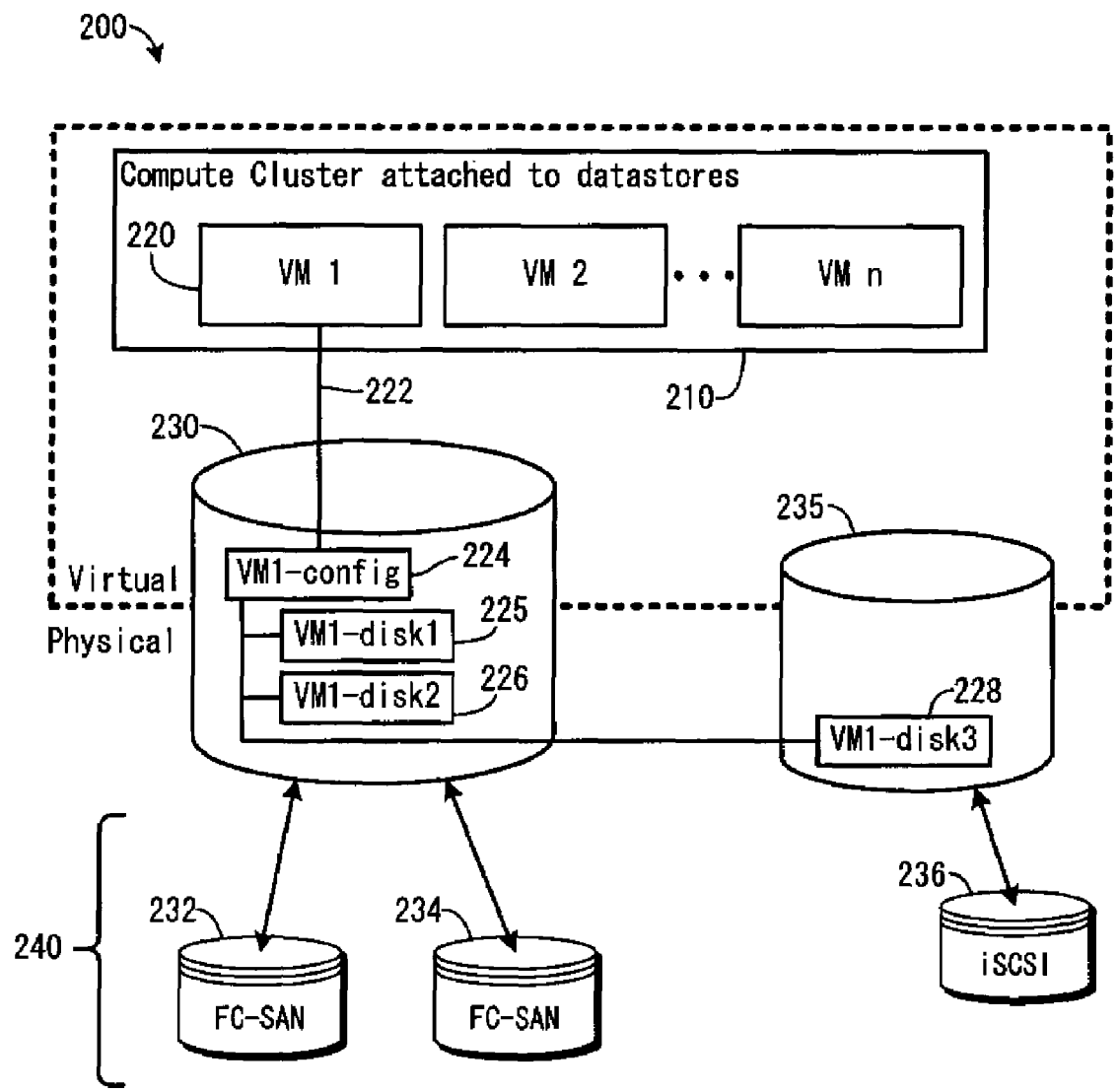
FIG. 2 shows a conceptual diagram illustrating how a system having a compute cluster may be logically connected to different storage systems.

FIG. 2 shows a conceptual diagram illustrating how a system 200 having a compute cluster 210 may be logically connected to different storage systems. Compute cluster 210 comprises any number of VMs, which may execute on multiple physical hosts connected as a cluster to a common storage system 240, which includes FibreChannel storage area networks (SANs) 232, 234 and iSCSI SAN disk 236. VM 220 has a configuration file 224 stored in datastore 230. Datastore 230 is a logical storage volume. In one embodiment, datastore 230 may be a logical storage volume for data stored in one or more storage devices 232, 234 using the file format VMFS from VMware, Inc. The data from datastore 230 is maintained in FibreChannel disks 232 and 234, whereas the data for datastore 235 is maintained on iSCSI disks 236.

Each VM is represented on datastores 230, 235 by configuration information, and virtual disk contents. If the VM is in a suspended state, state information of the VM (i.e., contents of processor registers, memory, etc.) may be saved to datastores 230, 235 as well. VM 220 has VM configuration file 224, which identifies three virtual disks associated with VM 220, the virtual disks being represented by disk image files 225, 226, and 228. Disk image files 225, 226 are located on datastore 230 whereas disk image file 228 is located on datastore 235. As described above, VDMS 130 (FIG. 1) maintains information associating datastores with desktop pools.

Pool manager 138 (FIG. 1) allows an administrator to provision desktop pools using sparse disk on multiple storage volumes, each datastore having different overcommit options. Furthermore, pool manager 138 allows the administrator to select what type of virtual disk image to store on each datastore. When provisioning multiple desktop pools over multiple storage volumes, each desktop pool can have its own per-volume policy for storage overcommit. In one embodiment, the administrator configures the desktop pools in this way using the administrator console 135 as previously described to access a storage allocation screen.

FIG. 3 shows, by way of example, a storage allocation screen 250 for one desktop pool. The interface allows the administrator to allocate the desktop pool across multiple datastores. Storage allocation screen 250 includes a table 260 summarizing whether and how the desktop pool being configured accesses each available datastore. Each row of table 260, except for header row 262, indicates characteristics of a corresponding available datastore and administrator configurations for how the desktop pool uses that particular datastore. Starting from the left, the first column allows the administrator to select (using checkboxes) which of the available datastores pool manager 138 (FIG. 1) is configured to store files for the VMs in the pool. As shown in FIG. 3, only Datastore 3 is selected and highlighted. However, the Administrator can select some or all of the available datastores for storing VM files, including virtual disk image files. The second column contains a list of available datastores. An icon indicates whether the datastore is local or shared to a single hypervisor or is attached to a cluster of hypervisors. More information about data storage in a virtual environment is provided by way of example in U.S. patent application Ser. No. 11/960,460, filed Dec. 19, 2007 by Daniel Hiltgen et al. The third and fourth columns of table 260 provide the capacity and free space associated with each datastore. The fifth column indicates the virtualization file system implemented on the datastore. Each of the example datastores listed in the table 260 employ the VMFS file system, which is a file system developed by VMware, Inc., for storing virtual machine disk images, as generally known. However, other well known file systems, such as NFS may be supported, depending on the implementation.

In the sixth column, the user may select whether to force pool manager 138 to store only virtual disk image files for certain types of virtual disks. In one embodiment, each virtual disk is identified as a particular type, e.g., an "OS" ("operating system") disk or a "User Data" disk. OS disks are virtual disks that have an operating system installed, and perhaps applications provided across the entire pool of desktops, whereas User Data disks may have the user's documents and settings, including configuration settings for the operating system and applications. Because different types of virtual disks grow in size at different rates, and are more or less sensitive to disk access speed and data throughput, allowing the administrator to select which type of disk to put on each datastore provides flexibility to significantly optimize the assignment of data storage resources to a desktop pool.

The administrator may decide to put the OS disks one datastore and user data disks on another datastore. This decision may be based on performance reasons. For example, the user data disks may be placed on high speed SAN. OS disks can go on less costly storage like NFS. Additionally, the disks may be placed on separate storage volumes because of different backup strategies. It is fairly easy to recreate the OS disk image using the master image so backing up OS disks may not be necessary in all cases. User data disks, on the other hand, may contain important data and may require regular backups. Array-based backup techniques can be easily used if all disks on a datastore are used for same purpose. In one embodiment, the administrator may put the base disk or the master disk for the pool on a high performance datastore like SSD (Solid State Drive) and all the delta (i.e., REDO) disks for the clones on less expensive SATA or IDE disks. This tiered storage model allows the administrator to reduce the overall cost of the deployment without compromising on the performance.

In the final column of table 260, the administrator is given the option of setting the level of storage overcommit. In one embodiment, the administrator can select between no overcommit, conservative overcommit, moderate overcommit, or aggressive overcommit, where the aggressive overcommit setting translates to the greatest amount of overcommit, i.e., the ratio between total logical capacity virtual disks to the physical size of the datastore is permitted to be the greatest at the "aggressive" setting. Pool manager 139 reserves space for sparse disk growth based on the administrator's selection in the last column as further explained below. As shown in the FIG. 3, storage allocation screen 250 helps the administrator in the sizing process by stating: "As the aggressiveness increases, less space will be reserved for sparse disk growth but more virtual machines will fit on the datastore."

A very high (i.e., aggressive) level of storage overcommit will result in relatively small amount of space being reserved for disk expansion; however, administrators will be able to create a lot of VMs on the datastore and keep the total cost of storage low. Because the administrator does not define the exact number of virtual machines that go on each datastore and leaves that decision to the pool manager software—the sizing process becomes easier.

In use, the administrator may decide to associate different overcommit settings for different datastores. For example, the user data disks for a deployment of marketing users are persistent and are sized based on the needs of end users and therefore none or conservative overcommit settings are preferable for the datastore that contains all the user data disks for the desktop pool. The datastore marked for storing the OS disks for the same set of desktops can use aggressive overcommit settings if control policies for reducing OS disk usage are used frequently.

In one embodiment, it is the responsibility of pool manager 138 (FIG. 1) to create a list of actions to provision a new virtual machines on one or more datastores, given the desktop pool details (i.e., the master VM, the number of clones to generate, the VMMS configuration, etc.), the datastore details (i.e., the capacity, free space, overcommit setting, and disk type, as described above with reference to FIG. 3) and other high level policies, e.g., to spread the VMs across as many datastores as possible to balance the load, etc.

In one embodiment, pool manager 138 implements an algorithm to generate the list of actions by treating each datastore like a bucket in which the "weight" of each bucket is based on the capacity and overcommit factor. Optionally, each datastore may be marked for a specific disk type as described above with reference to FIG. 3. Rather than looking at amortized cost for each VM on disk, which may be difficult to estimate, each clone is considered as a full pre-allocated clone (i.e., a clone VM having associated virtual disks in which the corresponding virtual disk image file is as big on the physical storage device as the logical address space of the virtual disk it represents). In addition, each datastore is assigned a "virtual capacity" which is equal to the actual capacity times an overcommit factor. For example, a thin clone created from a base disk of 5 GB may require 50 MB of physical disk space but is considered to be a full clone when the datastore weight is computed. A datastore may only have 100 GB of actual space, but for the purpose of datastore weight computation, it may be considered to have a virtual capacity of 500 GB.

In one embodiment, the overcommit factor is statically based on standard heuristics using input conditions. For example, aggressive overcommit may correspond to a 90% permitted storage reduction. In other words, if the LUN can only contain 100 pre-allocated clones, the same storage LUN may be permitted to contain 1000 thin clones. "Aggressive overcommit" therefore corresponds to a multiplier of ten, and therefore an "overcommit factor" of ten.

In another embodiment, the system may start with static heuristics for different overcommit settings, and thereafter monitor the growth of the VMs. The heuristics may then be adjusted dynamically depending on the continuous monitoring of the system. For example, a set of pool types may not be sized correctly and are discovered to grow quickly. Pool manager 138 may use the adjusted overcommit factors when new VMs are added to the same pool or when the desktop size is changed.

The pool manager computes the weight of each datastore to decide which datastore to place a VM if more than one datastore is assigned to the desktop pool. The weight may be calculated as the virtual capacity of the datastore minus the virtual used capacity at provisioning time minus the virtual used capacity at run time. The virtual capacity of the datastore is the total capacity of the datastore times the overcommit factor, as described above. The virtual used capacity at provisioning time is the sum of the maximum size of all of the virtual disk image files on the datastore. The maximum size of each virtual disk image file is approximately the total addressable space of the virtual disk (plus additional space virtual disk metadata). The virtual used capacity at runtime is space required for the hypervisor swap file for each VM. In some embodiments, the virtual used capacity at runtime is inapplicable if there is no hypervisor swap file.

Figure 4:
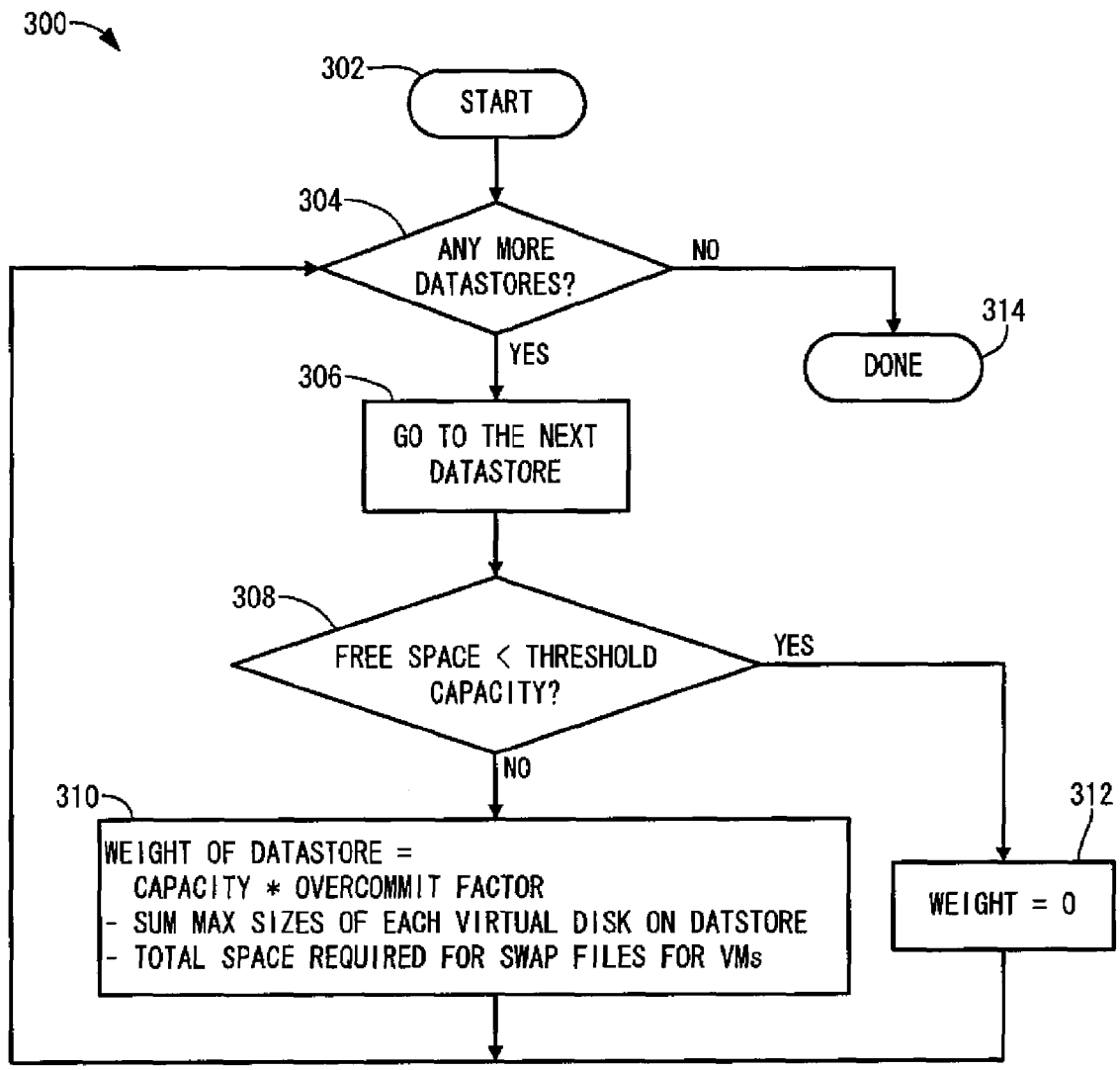
FIG. 4 shows a flowchart that illustrates by way of example a method for calculating the weights of all the datastores available to a desktop pool.

FIG. 4 shows a flowchart 300 that illustrates by way of example a method for calculating the weights of all the datastores available to a desktop pool. The datastores to be evaluated would be the datastores that are selected by the administrator for storing virtual disks for a particular desktop pool when provisioning VMs (clones) for that pool.

The procedure starts as indicated by start block 302 and proceeds to operation 304 wherein it is determined whether there are any more datastores for which to calculate a weight. If so, then the procedure flows to operation 306 wherein the next datastore is evaluated. Then, in operation 308, it is determined whether the free space in the datastore is exceeded by the threshold capacity. If the threshold capacity is greater than the free space, then the procedure flows to operation 312, wherein the weight is set to zero, effectively eliminating this datastore as a possibility to place more virtual disk image files, since the datastore is already considered "full." If, in operation 308, it is determined that there is more free space than the threshold capacity, then the procedure flows to operation 310, wherein the weight for the datastore is calculated as described above. Specifically, the weight is calculated as the virtual capacity (i.e., the capacity times the overcommit factor) minus the virtual used capacity at provisioning time (i.e., the sum of the maximum sizes for each virtual disk image file on the datastore) minus the virtual used capacity at runtime (e.g., the total space required for swap files for the VMs).

After the weight for the current datastore is determined in operation 310 or operation 312, the procedure returns to operation 304 to determine whether there are any more datastores for which to calculate weights. If not, then the procedure ends as indicated by done block 314.

In one embodiment, heuristics used for the computation of virtual used capacity is based on empirical data. For example, sparse disks for VMs having Windows XP® installed thereon on average only grow up to the memory size of the VM if all the user data is relocated to a separate disk or a network share. In this case, the virtual used capacity of the datastore may not use the maximum size of each virtual disk and similarly the overcommit factor may be adjusted (e.g., to free space on the LUN). In one embodiment, a procedure as illustrated in FIG. 4 is carried out every time a new clone is to be issued.

Figure 5:
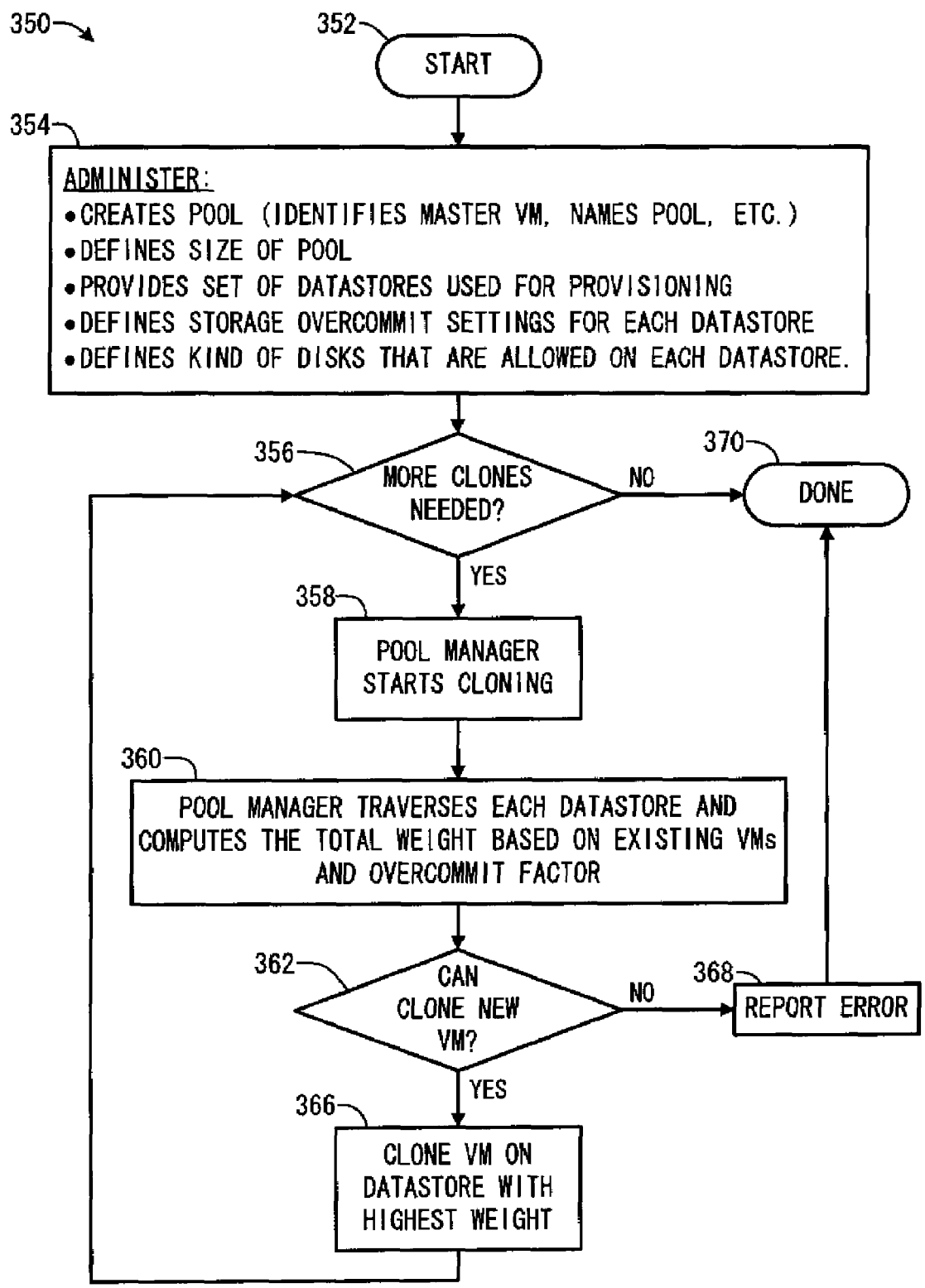
FIG. 5 shows a flowchart illustrating by way of example a procedure for creating a desktop pool having a set of VM clones.

FIG. 5 shows a flowchart 350 illustrating by way of example a procedure for creating a desktop pool having a set of VM clones. The procedure begins as indicated by start block 352 and flows to operation 354 wherein the administrator creates the pool, defines the size (i.e., the number of VMs in the pool), and attaches a set of datastores used for storing the virtual disk images and other data associated with the VMs in the pool. For each datastore, the administrator defines the overcommit settings and the type of disks that are permitted on the datastore. The selection of datastores and overcommit and type settings can be made by way of the storage allocation screen described above with reference to FIG. 3.

After operation 354, the procedure flows to operation 356, wherein it is determined whether more clones need to be provisioned to reach the size of the pool designated by the administrator. If so, then the procedure flows to operation 358 wherein pool manager 138 (FIG. 1) begins the cloning operation, which starts in operation 360. In operation 360, the datastores are analyzed and weights are calculated as described above with reference to FIG. 4. Then in operation 362, it is determined whether a new VM clone can be created. If all the datastores are full, i.e., their free space is less than their capacity threshold, then it may not be possible to clone any more VMs, in which case the procedure flows to operation 368 to report the error, and then the procedure ends as indicated by done block 370.

However, if a new VM clone can be created, then the procedure flows to operation 366, wherein the VM is cloned onto the datastore with the highest weight. Once the cloning operation is complete, the procedure returns to operation 356 to determine if any more clones are needed, and if not, the procedure ends as indicated by done block 370.

As can be seen by flowchart 350 in FIG. 5, the target datastore for a cloning process is the datastore with the highest weight. Furthermore, datastore weights are updated every time a new clone is required. If the datastores are reserved for specific disk types (OS, User, page file, etc), the VM may be provisioned on the set of datastores with the max datastore weights for the corresponding disk type.

It is contemplated that that the "highest weight first" algorithm described above may be replaced with a "fair share" or other known scheduling technique. "Highest weight first" approach ensures that all the datastores are leveled as more desktops are provisioned; if one datastore is running out of disk space, it suggests that other datastores are also in same situation and therefore more storage space should be allocated to this desktop pool. The leveling may be done based on storage capacity. The leveling may also be done based on other datastore attributes like available bandwidth, multipathing availability, file system type or a combination of one or more attributes. For example, fair share algorithms may be useful for filling up certain datastores faster, which may be desirable, e.g., to place more VMs on high bandwidth datastores or to prevent low bandwidth datastores from being overburdened.

As described above, a single datastore may be used for multiple desktop pools. A single datastores can also be used for both pre-allocated and thin disk based virtual machines. The above algorithm advantageously views each datastore as a single entity for provisioning large pools of mixed virtual disk permutations.

In certain embodiments, a set of policies may be associated with the virtual desktops to contain the growth of virtual disks over time. In one set of policies, referred to herein as "guest assisted policies," the administrator can schedule operations to perform disk cleanup at regular intervals. For example, a desktop pool may be configured for maintenance once every 14 days. For desk cleanup, inventory manager 136 (FIG. 1) will power-on the virtual desktops (if not in powered-on state) and schedule a guest disk cleanup operation. Guest cleanup operation will be performed or initiated by guest agent 139 and may include removing of temporary internet files, removing of downloaded program files, emptying of recycle bin, removing of windows temporary files among other things. Optionally, guest agent 139 can remove user installed applications and compress old files not in use. The disk cleanup may be followed by a virtual disk shrink or deflate operation to reduce the size of virtual disks used by the virtual machine on the file system.

Disk shrink or deflate is a known process involving the removal of empty or unused disk sectors from the sparse virtual disk image file, thereby reducing the storage requirements for the virtual disk image file. Rather than scheduling at specific time intervals, the guest based cleanup can also be scheduled at a specific disk threshold. For example, the operation can be scheduled when the disk utilization reaches 50% of total disk capacity. The disk utilization may be obtained by using the operating system API. The disk utilization is the ratio of the amount of data stored on the virtual disk to the total capacity of the virtual disk from the guest's perspective. The disk utilization may not be the same as the ratio between virtual disk image file size and logical virtual disk size, since the virtual disk image file may be a delta disk that references a parent or master image file for a majority of data, or the virtual disk image file may contain empty or unused sector data, e.g., sectors formerly occupied by a deleted file.

In another set of policies, referred to as "hypervisor based policies," inventory manager 136 computes, for each VM, the amount of virtual disk used space on the file system at every user log-off event. For VMs having separate OS disks and user data disks, the OS disk of the is monitored and if the size of the OS disk exceeds a pre-defined threshold (e.g., 50% of virtual disk capacity) the delta disk may be discarded and the VM reverted back to its "pristine" state. The user data disk, if present, that contains the user profile for each user, may be left intact. It should be noted that the disk usage described here is from the hypervisor file system's perspective. For example, the guest may report that "drive C:" is 50% full but the delta disk may only be 30% of the maximum disk size.

In one embodiment, the guest page file (e.g., the Windows swap file) may be assigned to a separate page file disk in independent non-persistent disk mode. In this case, the delta disk of the guest page file may be, according to one policy, discarded on every log-off (power-off VM after user logs-off with page file disk in independent non-persistent disk mode). The delta disk of the guest page file may similarly be scheduled to be discarded at regular intervals.

In alternative embodiments, disk checkpoints may be created after creation and customization (e.g. OS and page file disks) and restore the disk state to original state at regular intervals. In yet another embodiment, the VM may be deleted and recreated after every log-off or at regular intervals.

Inventory manager 136 (FIG. 1) may be responsible for performing automated rebalancing of datastores. Specifically, inventory manager 136 may identify a new, better virtual disk placement, optionally perform storage control operations on the VM, and generate a list of actions to implement the new placement based information about the desktop pool, the virtual disks being considered to move, datastore details, high-level policies (e.g., persistent/non-persistent VMs, refresh schedule, etc.) and identification of VMs that require a rebalance evaluation. The desktop pool information may include, the number of desktops in the pool, the default power states, the datastores, disk types (e.g., full or sparse and/or OS disk or user data disk), entitlements, state policies, etc. The datastore details may include information on the capacity of the datastore, the free space, the overcommit type and the disk type (OS vs. user data).

Rebalancing addresses the problem of ineffective initial VM placement or where workloads running inside the guests result in unexpectedly aggressive virtual disk growth, in which case the storage volume that contains all the virtual machines can run out of disk space and virtual desktops can cease to work, resulting in applications crashing inside the VMs. For example, suppose a desktop administrator overcommitted a datastore for a pool of desktops and the control policies did not yield effective results. If the free space on the datastore continues to decrease, the desktops may cease to work. In such a case, the desktop administrator may add another datastore to the desktop pool and apply a rebalance operation to balance the virtual machines resulting in more free space for virtual disks to grow.

In another example, the desktop administrator may have used multiple datastores for a desktop pool and one of the datastores begins to exhibit frequent disk errors. The desktop administrator would like to retire the datastore and relocate the virtual machines to another datastore. The desktop administrator can use the administrative interface to remove the existing datastore assigned to the desktop pool and perform a rebalance operation to migrate the virtual disks. Optionally, the desktop administrator can specify a replacement datastore and perform a rebalance operation for only the virtual machines on the defective datastore.

In some use cases, a desktop pool may have VMs with one more virtual disks spread across datastores. For example— each VM may have an OS disk on one datastore and a user data disk on a separate datastore. The administrator may notice over time the sizing for the datastore with user data disks is not done correctly and wants to add another datastore for user data disks and perform a rebalance operation to redistribute the disks. In some implementations, the desktop administrator may reserve one datastore as overflow storage for all desktop pools managed by VDM. In this embodiment, the datastore may be used to relocate existing virtual disks for automated rebalancing triggers if there is no storage available to existing pools and the overflow volume is attached to the hosts running the virtual machines.

Figure 6A:
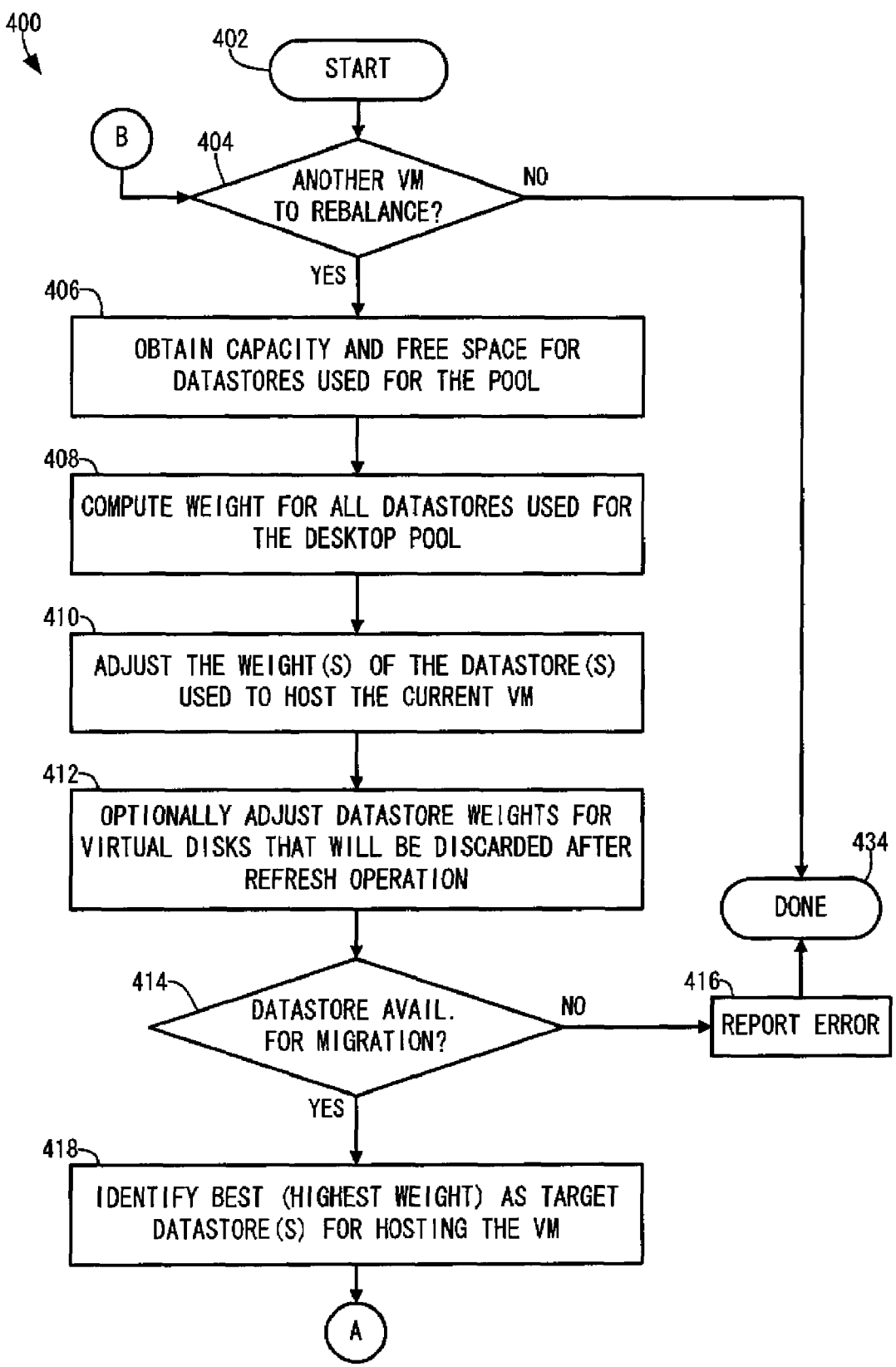
FIGS. 6A and 6B show a flowchart illustrating by way of example a procedure for balancing datastores assigned to a desktop pool.
Figure 6B:
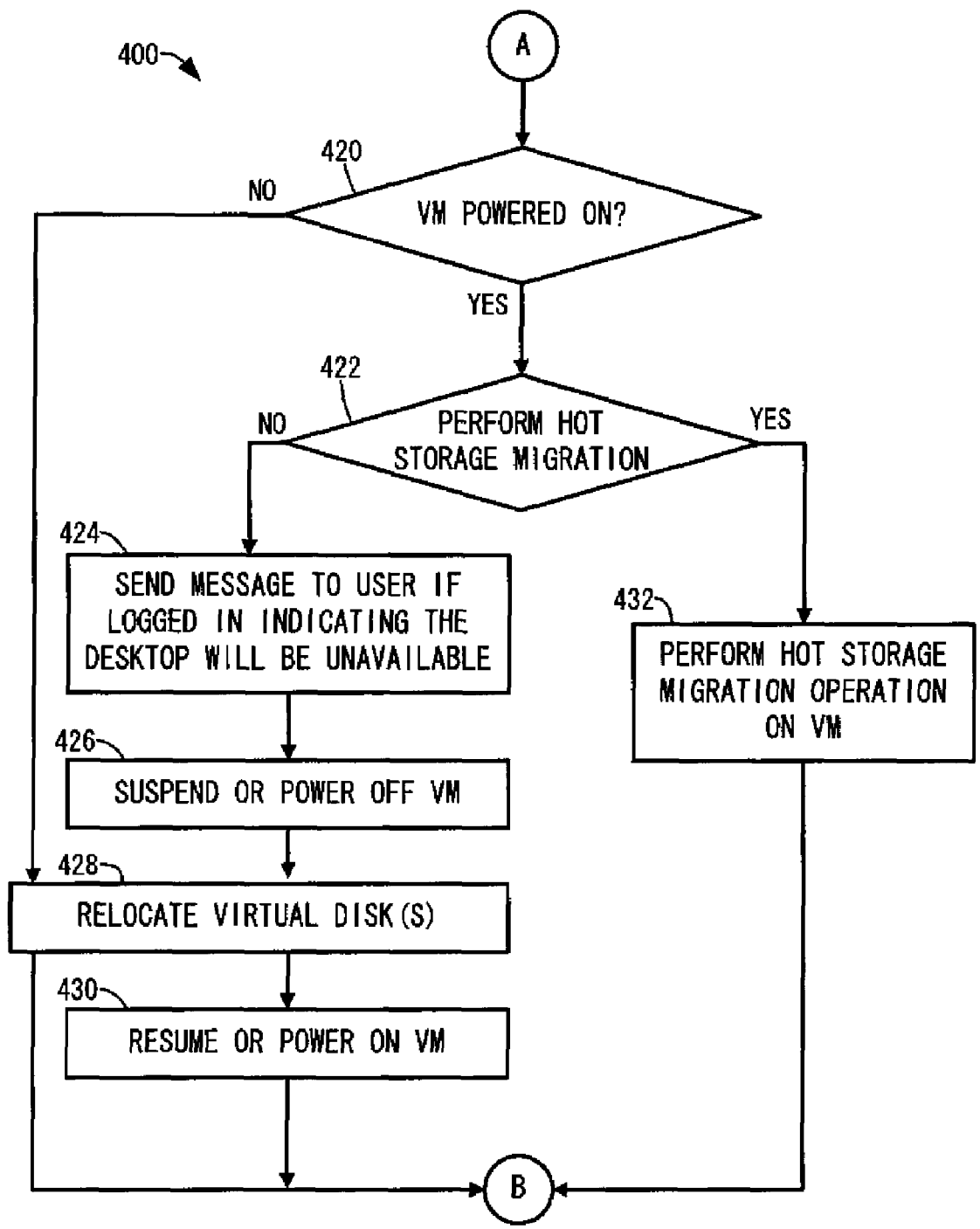

FIGS. 6A and 6B show a flowchart 400 illustrating by way of example a procedure for balancing datastores assigned to a desktop pool. The procedure begins as indicated by start block 402 and flows to operation 404 wherein it is determined whether there is another VM that requires rebalancing. Typically, each VM in a desktop pool may be balanced in turn in this manner, however, it may also be possible to allow the administrator to select specific VMs for balancing operations. If there is another VM to balance, the procedure flows to operation 406, wherein the capacity and free space is obtained for the datastores used for the pool.

Then, in operation 408, the weights for all the datastores used for the desktop pool are computed. The weights may be computed using the algorithm described above with reference to FIG. 4. Then in operation 410, the weight of the datastore or datastores used to host the current VM is adjusted to reflect the weight it would have without the VM being present. For example, the free space is increased by an amount equivalent to the size of the virtual disk image files on the datastore that are assigned to the current VM. In operation 412, the weights of the datastore may be further adjusted to reflect an absence of any virtual disk that will be discarded after a refresh operation (e.g., delta disks). The procedure then flows to operation 414 wherein it is determined whether there is a datastore available as a target for migration. There will be no datastores available as a target for migration if, for example, all the datastores are "full," i.e., the free space is exceeded by the capacity threshold. If there are no datastores available as a target for migration, the procedure flows to operation 416, wherein an error is reported, and then the procedure ends as indicated by done block 434.

If, in operation 414, there is at least one target available for migration, the procedure flows to operation 418 wherein the "best," i.e., the datastore having the highest weight is selected as the target datastore for hosting the current VM. The procedure then flows to operation 420 in FIG. 6B, to initiate the virtual disk migration operation.

In operation 420, it is determined whether the current VM is powered on. If the VM is not powered on, then the procedure jumps to operation 428 wherein the virtual disk files are relocated, then the procedure returns directly to operation 404 in FIG. 6A. If the VM is powered on in operation 420, then the procedure flows to operation 422 to determine whether or not hot storage migration is available or enabled. As described above, hot storage allows a virtual disk to be moved from one datastore to another without shutting down the attached VM. Details of how this is accomplished is presented by way of example in U.S. patent application Ser. No. 12/184,134, which is incorporated herein by reference. If hot storage migration is not available, or the administrator disabled this feature, then the procedure flows to operation 424, wherein, if the user is logged in, he or she may be sent a message indicating that the desktop will be unavailable for a specifiable (configurable) period of time. In one embodiment the text of the message may be configurable.

The procedure then flows to operation 426 wherein the VM is powered off or suspended. The VM may be suspended, in which case it is halted and its state stored to disk. Alternatively, it may be powered down, in which case all the running guest applications are closed, and any cached data is written to disk in the course of a normal shutdown procedure implemented by the guest operating system. After powering down or suspending the VM, the procedure flows to operation 428, wherein the virtual disk image files are relocated to the target datastore. The database accessed by VDMS is updated to reflect the new locations of the VM files. The procedure then flows to operation 430, wherein the VM is resumed or powered back on. The procedure then returns to operation 404 in FIG. 6A.

If, in operation 422, it is determined that hot storage migration is available, then the procedure flows to operation 432, wherein hot storage migration is carried out on the target VM as explained previously and described in detail in U.S. patent application Ser. No. 12/184,134. The procedure then returns to operation 404 on FIG. 6A.

If, in operation 404 (FIG. 6A), it is determined that there are no more VMs to rebalance, the procedure ends as indicated by done block 434.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for managing storage for a desktop pool, the desktop pool comprising a plurality of VMs, each having at least one virtual disk represented as a virtual disk image file on one of a plurality of datastores associated with the desktop pool, the datastores each being a logical storage volume of one or more storage system in electronic communication with a virtual desktop manager server that performs the method, the method comprising:
   calculating a weight of each datastore, the weight being a function of a virtual capacity of the datastore and the sum of maximum sizes of virtual disk image files on the datastore, the virtual capacity being a product of the data storage capacity of the datastore and an overcommit factor assigned to the datastore, the overcommit factor being selected by an administrator;
   selecting as a target datastore, one datastore of the plurality of datastores, the selecting being based on the weights of the datastores;
   placing data files for a VM that is a member of the desktop pool on the target datastore.

2. The method of claim 1, wherein the placing of the data files comprises:
   creating the VM by cloning a master VM; and
   storing the VM on the target datastore.

3. The method of claim 2, wherein the VM is thin-provisioned such that a virtual disk image file belonging to the VM is smaller than a capacity of a virtual disk represented by the virtual disk image file belonging to the VM.

4. The method of claim 2, wherein the creating of the VM from the master VM comprises creating a delta disk from a master disk image file, the delta disk representing a virtual disk of the VM and defining only differences between the virtual disk of the VM and the master disk; the target datastore not containing the master disk image file.

5. The method of claim 1, wherein the placing further comprises moving the VM from a source datastore to the target datastore as a part of a datastore rebalancing operation.

6. The method of claim 5, further comprising:
   adjusting a weight of the source datastore to reflect a weight the source datastore would be without the VM being present on the source datastore, and performing the selecting based on the adjusted weight of the source datastore.

7. The method of claim 5, wherein the moving of the VM is preformed using hot storage migration when the VM is powered on.

8. The method of claim 1, further comprising:
receiving a datastore assignment from an administrator, the datastore assignment designating the plurality of datastores that are associated with the desktop pool;
for at least one of the datastores, receiving a designation of a disk type restriction, the disk type restriction identifying a type of virtual disk image file is permitted to be placed on the datastore; and
the selecting further comprising identifying, for each type of virtual disk associated with the VM, a datastore that permits the type of virtual disk to be placed on the datastore.

9. The method of claim 8, wherein the VM includes an OS disk and a user data disk, the OS disk and user data disks being types of virtual disks, and the selecting identifies a first datastore designated for OS disks to place a virtual disk image file corresponding to the OS disk types and a second datastore designated for user data disk types to place a virtual disk image file corresponding to the user data disk.

10. The method of claim 1, wherein the weight is calculated as the virtual capacity minus the virtual used capacity at provisioning time minus the virtual used capacity at runtime, the virtual used capacity at provisioning time being the sum of the maximum sizes of the virtual disk image files on the datastore and the virtual used capacity at runtime including disk space required for hypervisor swap files.

11. The method of claim 1, further comprising:
identifying a policy for inhibiting growth of virtual disks by performing one or more operations to reduce the space required of virtual disk image files on a datastore, the policy including a schedule to perform the operations, the operations including one of a disk cleanup and reverting the VM to an original pristine state.

12. A non-transitory machine readable storage medium for managing storage for a desktop pool, the desktop pool comprising a plurality of VMs, each having at least one virtual disk represented as a virtual disk image file on one of a plurality of datastores associated with the desktop pool, the datastores each being a logical storage volume of one or more storage system in electronic communication with a virtual desktop manager server that performs the method, the machine readable storage medium comprising program instructions causing a computer system to implement a method, the method comprising:
calculating a weight of each datastore, the weight being a function of a virtual capacity of the datastore and the sum of maximum sizes of virtual disk image files on the datastore, the virtual capacity being a product of the data storage capacity of the datastore and an overcommit factor assigned to the datastore, the overcommit factor being selected by an administrator;
selecting as a target datastore, one datastore of the plurality of datastores, the selecting being based on the weights of the datastores;
placing data files for a VM that is a member of the desktop pool on the target datastore.

13. The machine readable storage medium of claim 12, wherein the placing of the data files comprises:
creating the VM by cloning a master VM; and
storing the VM on the target datastore.

14. The machine readable storage medium of claim 13, wherein the VM is thin-provisioned such that a virtual disk image file belonging to the VM is smaller than a capacity of a virtual disk represented by the virtual disk image file belonging to the VM.

15. The machine readable storage medium of claim 13, wherein the creating of the VM from the master VM comprises creating a delta disk from a master disk image file, the delta disk representing a virtual disk of the VM and defining only differences between the virtual disk of the VM and the master disk; and the target datastore does not contain the master disk image file.

16. The machine readable storage medium of claim 12, wherein the placing further comprises moving the VM from a source datastore to the target datastore as a part of a datastore rebalancing operation.

17. The machine readable storage medium of claim 16, wherein the method further comprises:
adjusting a weight of the source datastore to reflect a weight the source datastore would be without the VM being present on the source datastore, and performing the selecting based on the adjusted weight of the source datastore.

18. The machine readable storage medium of claim 16, wherein the moving of the VM is preformed using hot storage migration when the VM is powered on.

19. The machine readable storage medium of claim 12, wherein the method further comprises:
receiving a datastore assignment from an administrator, the datastore assignment designating the plurality of datastores that are associated with the desktop pool;
for at least one of the datastores, receiving a designation of a disk type restriction, the disk type restriction identifying a type of virtual disk image file is permitted to be placed on the datastore; and
the selecting further comprising identifying, for each type of virtual disk associated with the VM, a datastore that permits the type of virtual disk to be placed on the datastore.

20. The machine readable storage medium of claim 19, wherein the VM includes an OS disk and a user data disk, the OS disk and user data disks being types of virtual disks, and the selecting identifies a first datastore designated for OS disks to place a virtual disk image file corresponding to the OS disk types and a second datastore designated for user data disk types to place a virtual disk image file corresponding to the user data disk.

21. The machine readable storage medium of claim 12, wherein the weight is calculated as the virtual capacity minus the virtual used capacity at provisioning time minus the virtual used capacity at runtime, the virtual used capacity at provisioning time being the sum of the maximum sizes of the virtual disk image files on the datastore and the virtual used capacity at runtime including disk space required for hypervisor swap files.

22. The machine readable storage medium of claim 12, the method further comprising:
identifying a policy for inhibiting growth of virtual disks by performing one or more operations to reduce the space required of virtual disk image files on a datastore, the policy including a schedule to perform the operations, the operations including one of a disk cleanup and a VM revert.

* * * * *